Figure 1:
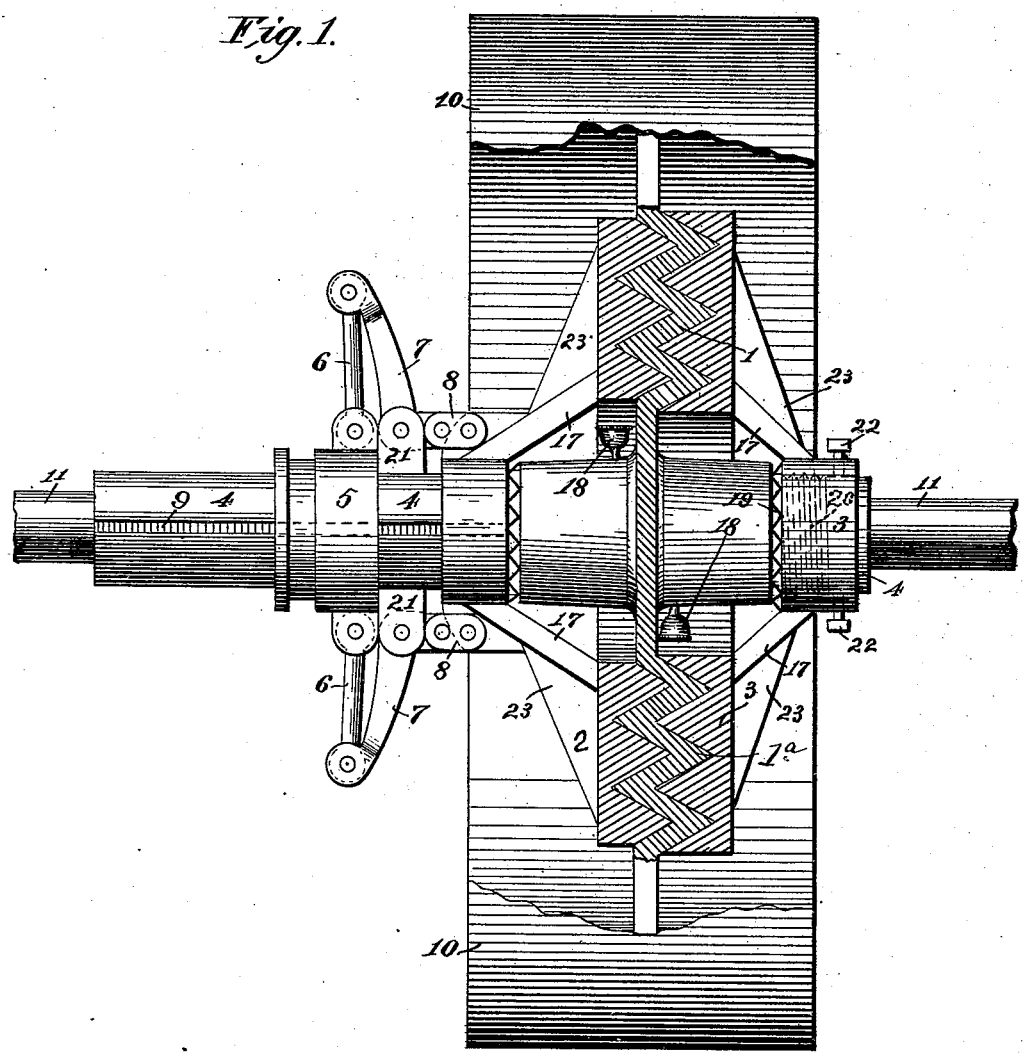

(No Model.) 3 Sheets—Sheet 1.

S. B. WILLIAMS.
CLUTCH.

No. 471,589. Patented Mar. 29, 1892.

Witnesses:
Oliver Williams
S Mortimer Williams

Inventor:
Samuel B. Williams

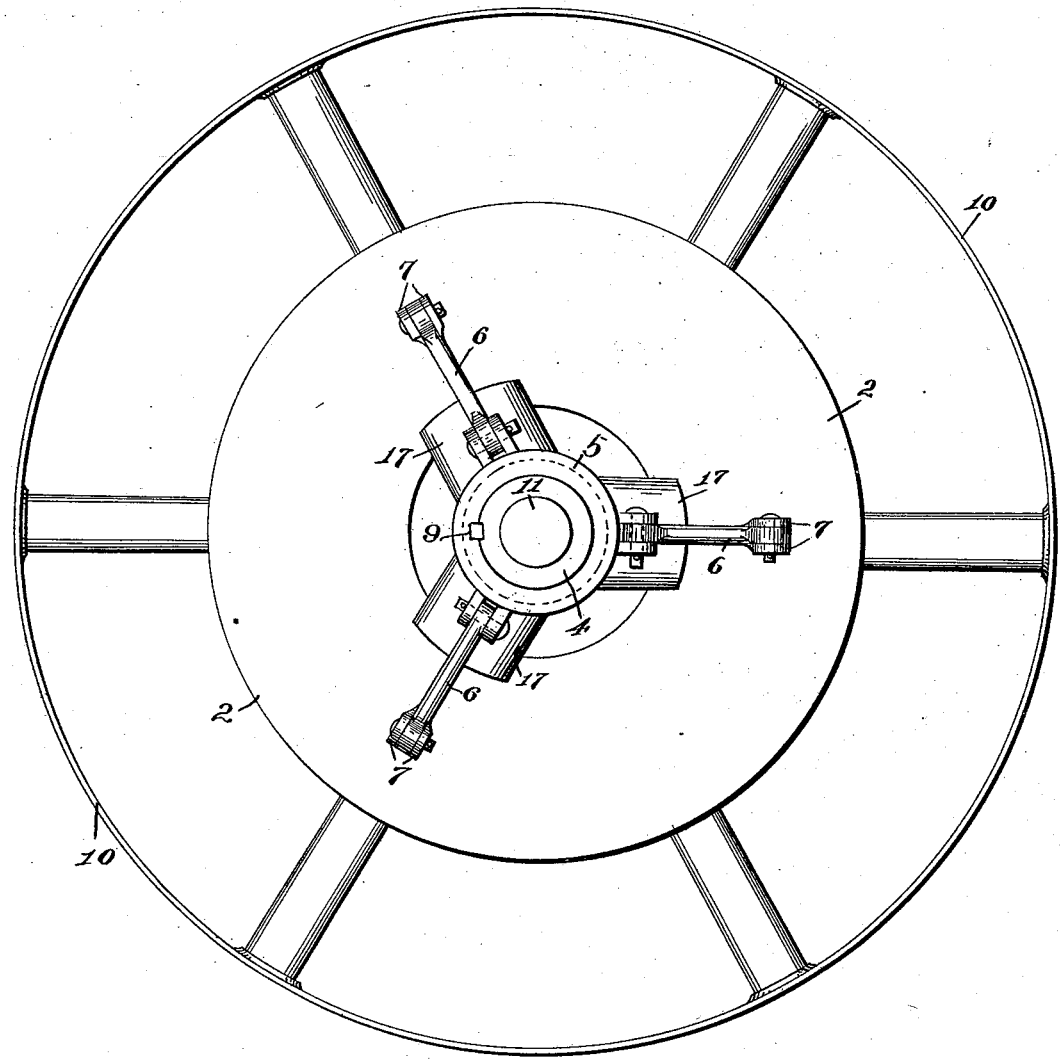

(No Model.) 3 Sheets—Sheet 3.
S. B. WILLIAMS.
CLUTCH.
No. 471,589. Patented Mar. 29, 1892.
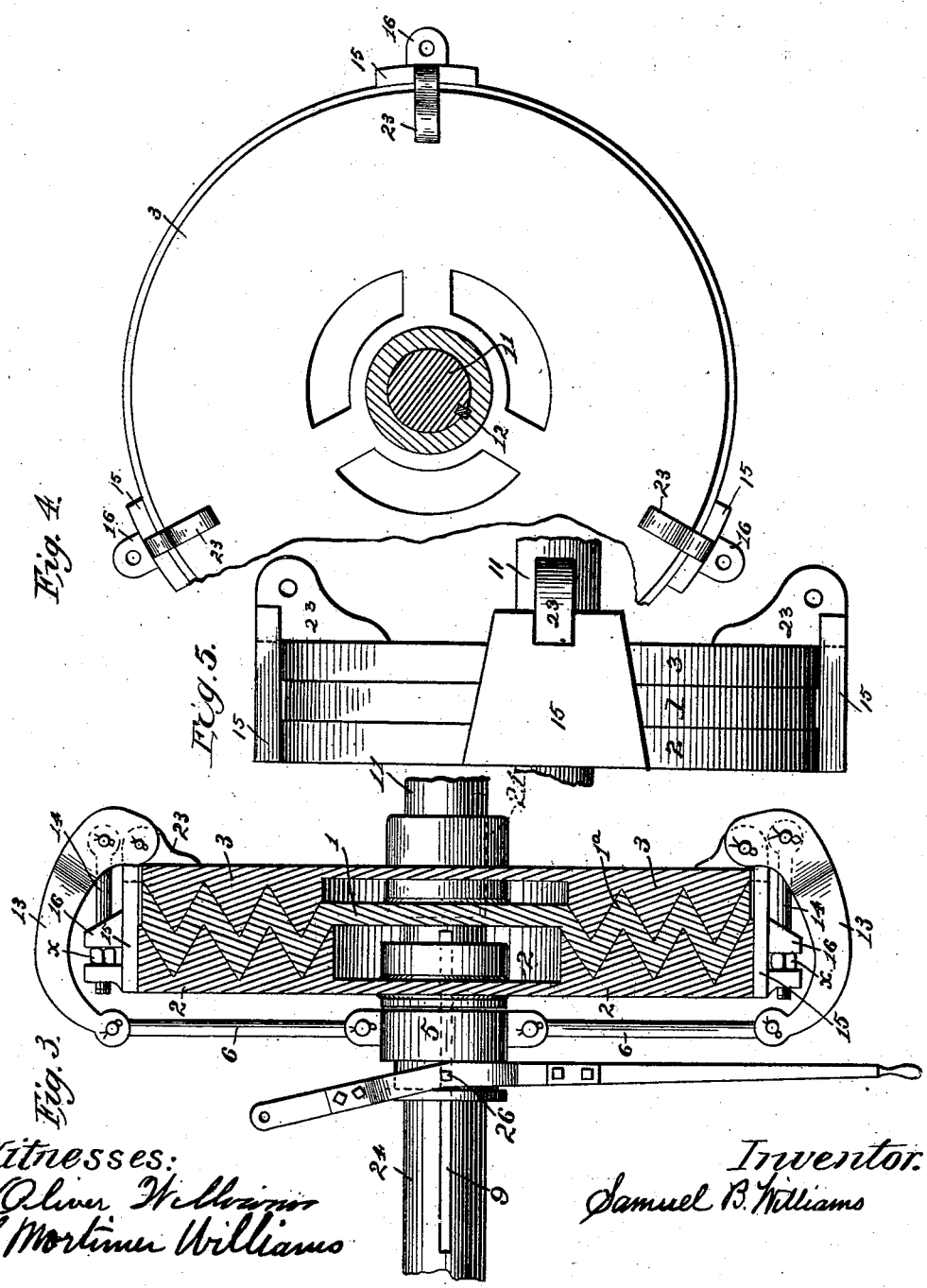
Witnesses:
Oliver Williams
S Mortimer Williams
Inventor.
Samuel B. Williams

UNITED STATES PATENT OFFICE.

SAMUEL B. WILLIAMS, OF MARTIN'S FERRY, OHIO.

CLUTCH.

SPECIFICATION forming part of Letters Patent No. 471,589, dated March 29, 1892.

Application filed February 7, 1891. Serial No. 380,706. (No model.)

*To all whom it may concern:*

Be it known that I, SAMUEL B. WILLIAMS, residing in the town of Martin's Ferry, county of Belmont, and State of Ohio, have invented a new and useful device for transmitting power, when desired, from a shaft in motion to another shaft, pulley, gear-wheel, or sprocket-wheel in a state of rest, or from a pulley, gear-wheel, or sprocket-wheel in motion to a shaft in a state of rest, of which the following is a specification.

This invention relates to an improved friction-clutch which can be used upon pulleys and drive-wheels to throw the same in and out of gear, or it may be employed as a cut-off coupling, when so desired, to throw a portion of a shaft in or out of motion.

The object of my invention is to provide a clutch or cut-off coupling that shall be exceedingly cheap and easy to construct—one that shall be safe and efficient at all times.

With these objects in view my invention consists in the peculiar construction of the various parts and their novel combination or arrangement, all of which will be more fully hereinafter described and claimed.

In the drawings forming a part of this specification, Figure 1 is a sectional view of my clutch as applied to a pulley. Fig. 2 is a side view of the same. Fig. 3 is a sectional view showing the principle applied to a cut-off coupling, and Fig. 4 is a side view of the same. Fig. 5 is an end view, the lever, &c., being removed.

In carrying out my invention I employ a central moving or driving disk 1, the surfaces of which may be flat or corrugated; but I have shown and prefer to use a disk that is concentrically corrugated, as at 1$^a$, thereby providing a very large frictional surface within a comparatively small diameter.

When the device is used simply as a clutch, the central corrugated disk is usually constructed integral with the hub of the pulley, forming the web or arms of the said pulley, as shown in Fig. 1; but when the device is employed as a cut-off coupling the central disk is independent and attached only to the driving-shaft 11, as shown in Fig. 3.

In Fig. 1 the pulley is mounted loosely upon the tubular shaft 4, said tubular shaft being rigidly mounted upon the drive-shaft 11 and provided with a longitudinal feather 9, and working upon said shaft and feather is a shifting collar 5. A friction-disk 2 is mounted upon the collar 5 adjacent to the central or driving disk, said friction-disk sliding upon the shaft 4 to engage or disengage the disk 1, said friction-disk being operated by the shifting collar through the medium of the rods 6, elbow-lever 7, pivoted to lugs 21, integral with shaft 4, and the links 8, connecting the elbow-levers 7 and the disk 2. When the central disk is corrugated, the face of the friction-disk adjacent to said central disk is also corrugated to mate therewith, and upon the opposite side of the central disk is arranged the abutting disk 3, the face thereof mating with the adjacent face of the central disk 1. The disk 3 has an internally-threaded hub, which is screwed upon the threaded portion 20 of the shaft 4, whereby the disk 3 can be adjusted as desired, and to hold said disk in place I employ the set-screws 22. Springs 19 are disposed between the hub of the pulley and the hubs of the disks 2 and 3, whereby when the collar is shifted to throw the friction-disk out of engagement the abutting disk will be thrown out also.

In Fig. 3 I have shown the principle of my invention as applied to a cut-off coupling, though the form therein shown and presently described can be used equally as well upon pulleys, gears, and the like.

The disk 1 is mounted upon the end of the drive-shaft 11, and the shaft 24 to be driven joins the shaft 11 in the hub of the said disk 1. The shaft 24 is provided with the feather 9 and collar 5, and the friction-disk 2 is also mounted upon said shaft. The abutting disk 3 is mounted loosely upon the hub of the disk 1. The adjacent faces of the disks 1, 2, and 3 may be plain or corrugated; but in this case, as before, I prefer to employ the concentrically-corrugated faces. Lugs or ears 23 are produced upon the outer edges of the disk 3 at definite intervals, and upon the periphery of the disk 2 are attached the guiding-plates 15, said plates being slotted and adapted to receive the lugs 23, thereby guiding the disks 2 and 3 in their in and out movements. The plates 15 are provided with parallel outwardly-projecting apertured lugs 16, and through said lugs are passed the bolts 14, nuts $x$ being secured upon said bolts between the lugs 16. A lever 13 is pivoted to each lug 23, said lever being curved outwardly to overlap the ends of disks and lugs 16, the free end of said lever being connected to a rod 6, which is in turn connected to the shifting collar 5. The bolt 14 is pivoted to the lever 13 near its pivotal end, whereby when the shifting lever is operated and the disk 3 thrown in or out the friction-disk will be operated simultaneously. The disks can be quickly and easily adjusted by means of the nuts $x$.

From the above it will readily be seen that I provide a form of friction-clutch that consists of a few simple parts conveniently assembled and easy to operate, giving positive action at all times.

Having thus described my invention, what I claim as new is—

1. The combination, with a central moving disk, of a friction-disk sliding upon a feather, the slotted guide-plates attached to the periphery of said friction-disk, an abutting disk, the lugs attached thereto, the levers pivoted to the said lugs, the link-rods connected with the levers, and a sliding collar connected with the link-rods, all arranged substantially as shown and described.

2. The combination, with a central moving disk, of a friction-disk arranged upon one side of the same, the slotted guide-plates attached to the periphery of the friction-disk and provided with outwardly-projecting apertured lugs, the abutting disk arranged upon the opposite side of the moving disk, the lugs formed upon the outer side of the same, the levers pivoted to said lugs, the link-rods connected with the lever, sliding collar connected with the link-rods, the adjusting-bolts pivoted to the lever, and nuts arranged upon the bolts and between the apertured lugs, substantially as shown and described.

SAMUEL B. WILLIAMS.

Witnesses:
S. MORTIMER WILLIAMS,
W. B. MCCLURE.